Aug. 25, 1953 W. P. OEHLER 2,650,103
COUPLING FOR LIFT TYPE DRAFT DEVICES
Filed March 16, 1951

INVENTOR
WILLIAM P. OEHLER
BY
C. Parker R. C. Johnson
ATTORNEYS

Patented Aug. 25, 1953

2,650,103

UNITED STATES PATENT OFFICE 2,650,103

COUPLING FOR LIFT TYPE DRAFT DEVICES

William P. Oehler, Moline, Ill., assignor to Deere & Company, Moline, Ill., a corporation of Illinois Application March 16, 1951, Serial No. 215,982

10 Claims. (Cl. 280—33.44)

The present invention relates generally to agricultural implements and more particularly to hitch devices constructed and arranged for quick and convenient attachment of implements to and detachment of implements from a propelling tractor.

The object and general nature of the present invention is the provision of hitch means particularly constructed and arranged to provide for quick and easy connection of the implement to a hitch propelling tractor when the implement and tractor parts to be interconnected are not disposed in exact alignment, one relative to the other. More specifically, it is a feature of the present invention to provide a socketed member on the implement and a detachably associated hitch pin carried normally as a part of the rear end of each tension link whereby, in connecting the implement to the tractor, the latter may be backed in an approximately straight line toward and up to the implement and the hitch pins then inserted into the sockets on the implement. The tension links, on tractors equipped with that kind of draft linkage, are arranged for only limited lateral swinging, and where the hitch pins are detachably associated with the tension links, there is a considerable greater leeway, when backing the tractor toward the implement, than is the case where the rear ends of the tension links carry apertured portions which are required to be moved laterally outwardly of and then passed laterally inwardly over integral studs carried by and inserted laterally outwardly at the ends of the implement-attaching member.

Further, it is a feature of this invention to provide a form of hitch pin means that is adapted to be carried in rockable balls or the equivalent at the rear ends of a pair of tractor hitch links, said hitch pin means being detachable from the links when lining the rear ends up with the implement member receiving the pin means, after which the latter may readily be inserted in place and the implement connected with the tractor.

An additional feature of the present invention lies in the provision of a combined hitch pin and lever on the tractor, each being mutually cooperative so that when the tractor and implement are in an approximately aligned position, the hitch pin or pins may be utilized as a lever or levers to bring the parts into exact alignment to facilitate their complete interconnection. Specifically, the present invention contemplates the provision of hitch pin means adapted to be carried in rockable balls or the equivalent at the rear ends of a pair of tractor hitch links, said hitch pins being adapted initially to be inserted part way into the sockets or other equivalent means on the implement and then the hitch means may be rocked angularly to bring the implement and tractor parts into exact alignment, whereupon the hitch pins may then be inserted completely into operative connection with the implement and held by suitable means in their locked positions, whereby to complete the connection of the implement to the tractor.

These and other objects and advantages of the present invention will be apparent to those skilled in the art after a consideration of the following detailed discussion of one preferred embodiment of the present invention, which is shown by way of illustration in the accompanying drawings, in which.

Figure 1:
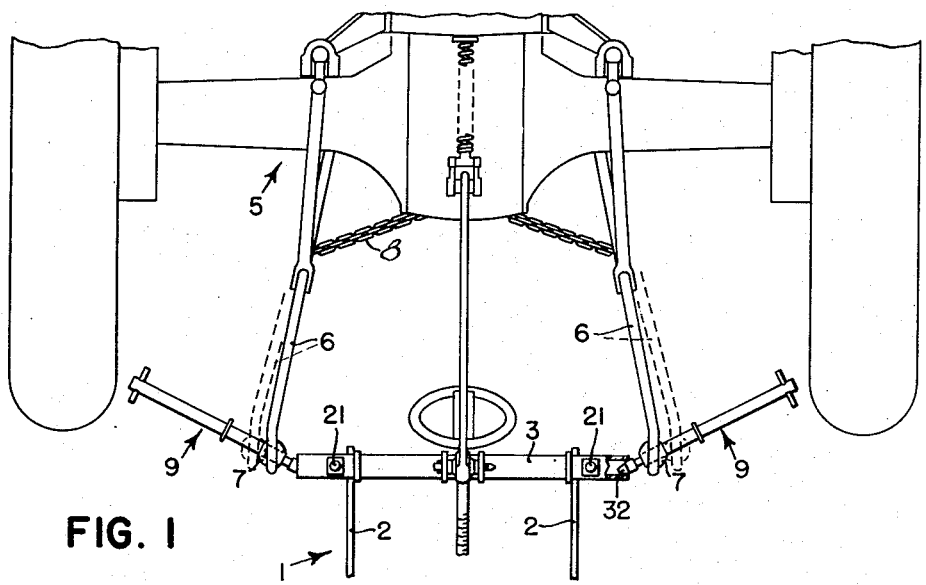
Figure 1 is a fragmentary plan view showing the rear portion of a tractor at the forward portion of an implement disposed in an approximately aligned position in which, by virtue of the present invention, the implement and tractor may be backed readily into an exactly aligned position and readily interconnected.

In illustrating the preferred form of the present invention, the reference numeral 1 indicates an agricultural implement, such as a plow having plow beams 2 connected at their forward ends to a transverse hitch member 3, the implement 1 being adapted to be connected to a tractor 5 of the type having a pair of lower, laterally and vertically swingable tension links 6. Each of these links carries at its rear end a rockable ball 7 which is apertured, as at 8, to receive suitable hitch means connecting the rear ends of the links 6 to an implement. The lateral swinging of the links 6 is limited by a pair of chains 8, the links 6 in one commercial form of the tractor plow being limited in their lateral outward movement to positions indicated generally in dotted lines in Figure 1. A tractor of this type is shown, for example, in the U. S. Patent to Ferguson 2,223,002. As disclosed in said patent, the forward ends of the draft links 6 are connected with the tractor structure by ball and socket joints. The two arms 6 are swingable laterally independently of one another but the arms or links 6 are connected through suitable means with a power lift actuated rockshaft (not shown) whereby the two mentioned links 6 are constrained to swing vertically together.

Figure 3:
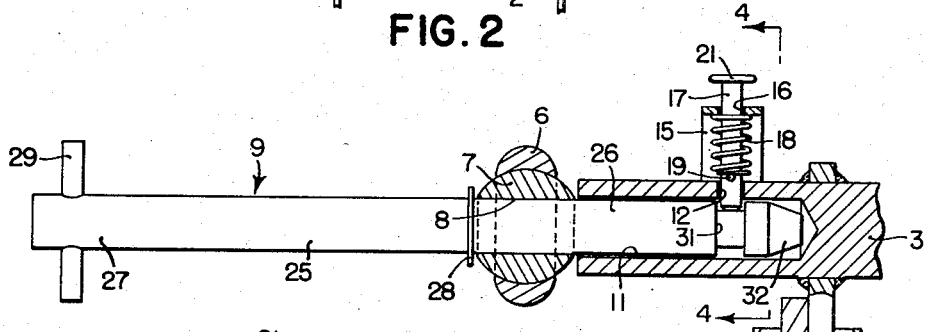
Figure 3 is an enlarged sectional view taken generally along the line 3—3 of Figure 2.

Referring now more particularly to Figures 1 and 3, the transverse member 3 of the implement 1 is provided at each end with a laterally inwardly extending axial slot or socket 11, and communicating with the laterally inner portion of each slot 11 is a cross bore 12. Mounted on each end portion of the transverse member 3 is a generally inverted, U-shaped bracket 15 the ends of which are secured, as by welding, to the member 3, the intermediate portion of the bracket being apertured, as at 16, to receive a plunger 17, the inner end of which extends through the bore 12 into the associated socket 11. A spring 18 surrounds the plunger 17 and at its upper end bears against the central portion of the bracket 15 and at its lower end bears against a pin or cotter 19 carried by the plunger 17. The outer end of the latter is formed with a flanged head 21 by which the plunger may be grasped and lifted up to carry the inner end of the plunger out of the socket 11.

According to the principles of the present invention, each of the ball members 7 is adapted to receive the associated hitch pin or draft pin 9 mentioned above. Each of these hitch pins comprises an elongated member 25 having a laterally inner socket-entering end 26 and a laterally outer handle section 27, the inner end section being separated from the handle section by an abutment 28, which may be in the form of a washer secured, as by welding, to the elongated member 25. At the outer end of the handle section 27 the latter carries a cross pin 29 by which the member 9 may be grasped for inserting or removing the pin 9. The laterally inner portion of the end section 26 is formed with an annular groove 31 which is dimensioned to receive the inner end of the locking plunger 17, and the innermost portion of the pin 9 is tapered, as at 32, forming a portion that is appreciably smaller in diameter than the internal diameter of the socket 11. The operation of the hitch structure of the present invention is substantially as follows.

Assuming it is desired to connect the implement 1 with the tractor 5, the latter is usually backed toward the implement until the ball ends of the tension links lie in positions adjacent the ends of the transverse hitch member 3. However, with the present invention, it is not necessary that the ball ends be accurately aligned with the implement member 3 as in prior devices of this nature. When the connector balls 7 at the rear ends of the tension links 6 are disposed outwardly of and in the general neighborhood of the laterally outer ends of the member 3, each of the hitch pins 9 may be rocked in the associated connector balls 7 until the inner reduced end 32 of each pin can be inserted partially into the laterally outer end of the associated socket 11. Then each hitch pin 9 may be used as a lever or pry to permit the operator to manually rock the hitch pins angularly so as to bring the balls 7, carrying the hitch pins 9, into accurate alignment with the sockets 11. Then the hitch pins 9 may be inserted all the way into the sockets 11 until the inner ends of the spring-biased plungers 17 ride over the reduced end 32 and into the groove 31 in the associated pin. The abutment member 28 is so located that, when the locking pin 17 moves into the locking groove 31, the abutment 28 is disposed against or closely adjacent the laterally outer side of the associated ball connector 7 whereby the tension links 6 are held against laterally outward displacement. The length of the sockets 11 is such that when the hitch pins 9 are locked in their fully inserted positions, there is a sufficient length or area of bearing between the associated parts that normal draft loads can be transmitted between the tension links 6 and the implement hitch member 3.

Figure 2:
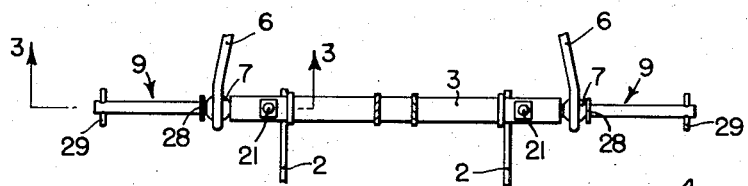
Figure 2 is a fragmentary view similar to Figure 1, showing the implement and tractor parts in their accurately aligned and interconnected position.

An important advantage of the present invention, both in the form described above and in the modified form shown in Figure 5 and described below, is the appreciably greater latitude permitted in backing the tractor for connection to the implement. In a device constructed according to the principles of the present invention, it is much easier to maneuver the tractor into a position permitting the connection of the implement to the tractor than in the usual form of the Ferguson linkage in use today. The Ferguson linkage is adapted to be used with implements in which there are laterally outwardly extending studs carried as a permanent part of the implement and adapted to receive the ball connectors 7 when the latter are swung laterally inwardly toward the implement in substantial alignment with the studs. In order to illustrate this advantage, I have indicated in dotted lines in Figure 5 the position of the conventional attaching studs, indicated by the reference numeral s, in which these parts would be disposed if the attaching member 3 were of conventional form. Looking at Figure 5, it will be seen that there is only a small space b between the maximum outermost positions of the links 6 and the ends of the studs, whereas when the studs are eliminated and, instead, socketed hitch pins employed, such as those indicated in Figures 1 and 3, there is a latitude corresponding to the sum of the distances a shown in Figure 5, when bringing the tractor into position for connection to the implement. While shown in connection with the form of the invention shown in Figure 5, the above-mentioned advantages in greater latitude in connecting the tractor to the implement are present to an equal degree in the extended handle type of hitch pin shown in Figures 1–3 and described above.

Figures 4, 5:
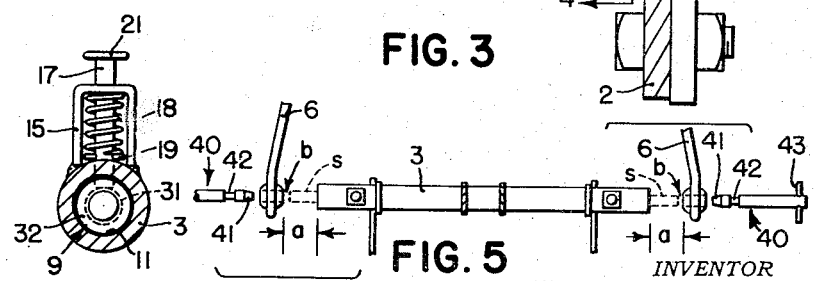
Figure 4 is a view taken along the line 4—4 of Figure 3.
Figure 5 is a fragmentary view somewhat similar to Figures 1 and 2, showing a modified form of the present invention.

Referring now to Figure 5, which shows a modified form of the present invention that is particularly adapted for use with fairly lightweight implements, in which the advantages of a long lever arm or handle on the draft pin members 9 is not particularly required: In this form of the invention each of the hitch pin means is indicated in its entirety by the reference numeral 40 and is of substantially the same construction as the hitch pins 9, except for the extension or handle section 27. As shown in Figure 5, each hitch pin 40 includes an inner tapered end 41, an annular groove 42, adapted to receive the associated plunger 17, and a handle 43 which, if desired, may take the place of the abutment 28 described above, being so located on the hitch pin 40 that when the latter is locked in the associated socket 11, the handle serves to keep the ball connector 7 substantially against the associated end of the hitch frame member 3.

In both forms of this invention, the implement may readily be disconnected from the tractor at any time desired, merely by lifting the plungers 17 out of the grooves 31 and then pulling the hitch pins 9 out of the associated sockets 11.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a tractor-implement hitch structure, the combination of a tractor hitch linkage of the type having a pair of tension links, each having an apertured portion at its outer end, an implement hitch structure including a transverse member having at one end a laterally inwardly extending socket, a hitch pin for connecting the apertured end of one of said links with said socketed end of said transverse member, said hitch pin including an inner end section having a pointed end smaller in diameter than the internal diameter of the socket in said transverse hitch member, whereby in connecting the implement to the tractor the inner end portion of said hitch pin may be passed through the apertured end of the associated tension link and the inner pointed end may be inserted part way into said socket from an angle, whereupon the pin may serve as a lever to bring the apertured end of the tractor link into axial alignment with the axis of said transverse member and the pin then inserted all the way into the associated socket, and means carried by said transverse member and engageable with the associated hitch pin for locking the latter in its fully inserted position.

2. In a tractor-implement hitch structure, the combination of a tractor hitch linkage of the type having a pair of tension links, each having an apertured portion at its outer end, an implement hitch structure including a transverse member having at one end a laterally inwardly extending socket, means for connecting the other end of said implement transverse member with the associated tension link, a hitch pin for connecting the other tension link with said socketed end of said transverse implement member, said hitch pin including an inner end section having a pointed end smaller in diameter than the internal diameter of the socket in said transverse implement member, whereby, after the tractor has been maneuvered into a position relative to the implement so as to engage the means connecting said other end of said implement transverse member with its associated link, the inner end section of said hitch pin may be passed through the aperture in the tractor tension link associated therewith and the inner pointed end may be inserted part way into said socket from an angle, thereby accommodating some misalignment between the implement transverse member and said other tractor link, after which the pin may serve as a lever to bring the apertured end of said other tractor link into axial alignment with the socket in said transverse member and the pin then inserted all the way into said socket, and means carried by said transverse member and engageable with said hitch pin for locking the latter in its fully inserted position.

3. The invention set forth in claim 2, further characterized by an abutment on said hitch pin located so as to hold said other tractor link in a position substantially against the socketed end of said transverse member when said hitch pin is held in its fully inserted position in said socket.

4. The combination of a tractor hitch linkage of the type having a pair of generally laterally and vertically swingable tension links, each having an apertured ball at its outer end rockably mounted therein, an implement hitch structure including a transverse member having at each end a laterally inwardly extending socket, said links being swingable laterally and outwardly independently of one another and swingable vertically together, and a pair of hitch pins for connecting the ball ends of said links with the ends of said implement member, each of said hitch pins including an inner end section having a pointed end smaller in diameter than the internal diameter of the socket in the adjacent end of said transverse hitch member, whereby the inner end section of said hitch pin may be passed through the apertured ball and the inner pointed end may be inserted part way into said socket from an angle whereupon the pin may serve as a lever to bring the ball of the associated tractor link into axial alignment with the axis of said socketed transverse member and the pin then inserted all the way into the associated socket, and means carried adjacent each end of said transverse member and engageable with the associated hitch pins for locking them in their fully inserted positions.

5. A tractor-implement hitch construction comprising a combination with a tractor hitch linkage of the type including a pair of generally laterally and vertically swingable tension links, each having an apertured ball at its outer end rockably mounted therein and a pair of hitch pins, each having an inner implement-receiving end adapted to be inserted through the aperture in the associated rockably mounted ball and an outer handle end by which each hitch pin may be inserted into the associated rockable ball and shifted to various angular positions relative to the associated tractor link, of an implement hitch structure including a transverse member having axially inwardly extending sockets at its ends adapted to receive the inner end portions of said hitch pins, the inner ends of said pins and the outer ends of said sockets being so shaped, one relative to the other, that the tractor may be maneuvered into a position in which the ball ends of said links are close to but not necessarily in a position of alignment with said transverse hitch member, whereupon the inner ends of said hitch pins, carried by said rockable balls at the outer ends of said tension links, may be inserted part way into the outer ends of said sockets and the handle portions of said links then utilized as levers to force the ball ends of said tension links into arcuate alignment with said implement transverse member and the hitch pins then inserted all the way into the associated sockets, and means carried by said transverse member for holding said hitch pins in their fully inserted positions in said sockets.

6. For use with a tractor hitch linkage of the type having a pair of generally laterally and vertically swingable tension links, each having an apertured ball at its outer end rockably mounted therein, hitch means for connecting an implement to the tractor including a transverse hitch member having at each end a laterally inwardly extending socket, a pair of elongated hitch pins, each including an inner socket-entering section and an outer handle section with an abutment fixed to the hitch pin between said sections, each pin being adapted to be inserted through the rockably mounted ball at the outer end of the associated tractor-carried link and to be inserted part way into the associated socket in the transverse hitch member, said pin being adapted to be rocked relative to the associated tension link in order to have the inner end of the pin enter the socket when the ball ends of said transverse links are not in exact alignment with said transverse hitch member, said handle sections of said pins being then adapted to be used as levers to bring the ball ends into exact alignment relative to the transverse hitch member, whereupon the inner ends of said hitch pins may be fully inserted into said sockets, said abutments on said pins engaging the outer sides, respectively, of said rockably mounted balls, and means carried by said transverse member for locking the hitch pins in their fully inserted positions in said sockets, said abutments preventing laterally outward displacement of said ball ends of said tension links relative to said transverse hitch member.

7. The invention set forth in claim 6, further characterized by said hitch pin retaining means including a spring-biased plunger biased for movement into the inner end portion of each of said sockets and each of said hitch pins including an annular groove in the inner end portion of the pin shaped to receive the inner end of said locking plunger.

8. Hitch structure comprising an implement-carried hitch member having an inwardly extending socket and a cross bore communicating with the inner portion of said socket, a bracket carried by said member, a plunger axially shiftable in said bore and supported for shifting movement in said bracket, spring means acting between the inner end portion of said plunger and said bracket whereby said spring biases said plunger for movement into said socket, and a hitch pin detachably associated with said hitch member and comprising an elongated part insertable into said socket and having adjacent its inner end an annular groove to receive the inner end of said spring-biased plunger, the axially inner end of said hitch pin being tapered to facilitate movement of said hitch pin into a position in which said spring-biased pin will enter said annular groove, and an abutment on said hitch pin spaced axially outwardly of the inner end of said hitch pin a distance greater than the effective axial depth of said socket, whereby, when said hitch pin is locked in said socket by said plunger, said abutment is disposed axially outwardly of the adjacent end of said implement hitch member a distance sufficient to receive an apertured tractor-carried link or the like between the abutment and the end of the implement hitch member.

9. The invention set forth in claim 8, further characterized by a handle section on said hitch pin extending outwardly of said abutment.

10. In a tractor-implement hitch structure, the combination of a tractor hitch linkage of the type having a pair of tension links, each having an apertured portion at its outer end, an implement hitch structure including a transverse member having at one end a laterally inwardly extending socket, a hitch pin for connecting the apertured end of one of said links with said socketed end of said transverse member, said hitch pin including an inner end section having a pointed end smaller in diameter than the internal diameter of the socket in said transverse hitch member, whereby in connecting the implement to the tractor the latter may be backed into position relative to the implement so as to bring the apertured portions of the tension links in approximate alignment with and axially outwardly of said transverse member, whereby the associated hitch pins may then be passed through the apertured ends of the tension links and into said sockets, and means carried by said transverse member and engageable with the associated hitch pin for locking the latter in its fully inserted position.

WILLIAM P. OEHLER.

References Cited in the file of this patent

UNITED STATES PATENTS

| Number | Name | Date |
|--------|------|------|
| 825,891 | Browne | July 17, 1906 |
| 2,384,245 | Forney | Sept. 4, 1945 |